United States Patent
Asano et al.

(10) Patent No.: US 7,122,983 B2
(45) Date of Patent: Oct. 17, 2006

(54) ROTATING ANGLE DETECTING APPARATUS AND ELECTRIC POWER STEERING APPARATUS

(75) Inventors: Takatsugu Asano, Toyohashi (JP); Toshio Kohno, Nagoya (JP)

(73) Assignees: FAVESS Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/106,429

(22) Filed: Apr. 15, 2005

(65) Prior Publication Data

US 2005/0237016 A1   Oct. 27, 2005

(30) Foreign Application Priority Data

Apr. 16, 2004 (JP) ............... 2004-121601

(51) Int. Cl.
*H02P 7/00* (2006.01)
(52) U.S. Cl. ............ 318/432; 318/434; 318/138; 318/439; 318/254; 318/700
(58) Field of Classification Search ......... 318/254, 318/654, 661, 605, 138, 439, 432–434
See application file for complete search history.

(56) References Cited

U.S. PATENT DOCUMENTS

| 4,318,617 A | 3/1982 | Orsen |
| 5,406,267 A | 4/1995 | Curtis |
| 6,304,074 B1 | 10/2001 | Waffenschmidt |
| 6,644,434 B1 * | 11/2003 | Fujii et al. ............... 180/446 |
| 6,803,781 B1 * | 10/2004 | Kobayashi et al. ......... 324/772 |
| 6,882,163 B1 * | 4/2005 | Ura ........................... 324/656 |
| 6,901,816 B1 * | 6/2005 | Yamaguchi ............ 73/862.326 |

FOREIGN PATENT DOCUMENTS

| EP | 0 602 697 A1 | 6/1994 |
| JP | 11037797 | 2/1999 |

* cited by examiner

*Primary Examiner*—Lincoln Donovan
*Assistant Examiner*—Tyrone Smith
(74) *Attorney, Agent, or Firm*—Oblon, Spivak, McClelland, Maier & Neustadt, P.C.

(57) ABSTRACT

The invention provides an electric power steering apparatus which can detect a ground fault of an angular resolver without fault. Values of a first resistance (R1), a second resistance (R2), a third resistance (R3) and a fourth resistance (R4) are set such that a difference between a minimum output potential (Vout Min) of a first differential amplifier (OP1) at a time when an angular resolver is not in a ground fault which may be generated on the basis of a dispersion of the first resistance (R1), the second resistance (R2), the third resistance (R3) and the fourth resistance (R4), and a direct-current resistance component (Rdc) of the angular resolver, and a maximum potential (Vout Max) at a time when the angular resolver is in the ground fault becomes equal to or more than a predetermined margin for preventing an erroneous ground fault detection in a CPU (62) side. Accordingly, it is possible to detect the ground fault of the angular resolver on the basis of an output potential (Vout) of the first differential amplifier (OP1) without fault.

9 Claims, 12 Drawing Sheets

Fig. 11

|  | REASON OF DISPERSION |
| --- | --- |
| RESOLVER OUTPUT COIL | DISPERSION OF COIL RESISTANCE |
| ECU I/F | TOLERANCE OF RESISTANCE |
|  | RESISTANCE TEMPERATURE CHARACTERISTIC |
| ENVIRONMENT | TEMPERATURE OF AMBIENT ATMOSPHERE |

ROTATING ANGLE DETECTING APPARATUS AND ELECTRIC POWER STEERING APPARATUS

CROSS-REFERENCE TO RELATED APPLICATION

The present application claims priority under 35 U.S.C. §119 to Japanese Patent Application No. JP2004-121601. The content of the application is incorporated herein by reference.

BACKGROUND OF THE INVENTION

1. Field of the Invention

The present invention relates to a rotating angle detecting apparatus detecting a rotating angle of a detected subject by using an angular resolver, and an electric power steering apparatus assisting a steering by attaching the angular resolver to a torsion bar connected to a steering wheel, detecting a steering torque on the basis of a rotating angle determined by the angular resolver, and determining an assist amount so as to control a motor.

2. Description of the Related Art

In conventional, there has been known an electric power steering apparatus which reduces a steering force by a steering wheel by applying an assist force generated by a motor to a steering mechanism connected to a steering shaft. In the electric power steering apparatus mentioned above, there is a case that a torque sensor determining a steering torque on the basis of a torsion of a torsion bar is employed. As a rotating angle sensor of this kind of torque sensor, there has been generally employed an angular resolver having a high mechanical reliability. As the electric power steering apparatus in accordance with the structure mentioned above, there is JP HEI 11-321689 A.

Since an output from the angular resolver is constituted by alternating-current analogue signals of a sin phase or a cos phase, the output is generally raised by applying an offset voltage to the sin phase and the cos phase in accordance with an offset voltage applying circuit so as to convert into a direct-current analogue signal and thereafter is converted into a digital signal via an A/D converter, for the purpose of allowing a process by a CPU. JP 2000-132226 A shows a structure for detecting a disconnection of the resolver. JP HEI 11-37797 A shows a structure for detecting a disconnection of the sensor and a ground fault.

3. Prior Art

JP HEI 11-321689 A
JP 2000-132226 A
JP HEI 11-37797 A

In the electric power steering apparatus, in order to increase a reliability, it is desirable to detect the disconnection and the ground fault between the angular resolver detecting the steering torque and the CPU and employ a countermeasure of gradually lowering the assist force or the like when the disconnection or the ground fault is occurred. For example, when a harness comes off due to a vibration or the like and the disconnection is generated, or when a wire is in contact with a vehicle body in the case that the vehicle runs on a curb stone and the ground fault is generated, it is necessary to stop the assist of the steering on the basis of a signal from the angular resolver.

In a method of detecting the disconnection and the ground fault, since the signal from the angular resolver rised by applying the offset voltage by the offset voltage applying circuit changes at a time of the disconnection and the ground fault with respect to a normal time, it is possible to detect on the basis of this change. Since a direct-current component resistance value of an output coil structuring the angular resolver becomes infinitely large and a potential change is large at a time of the disconnection, it is possible to accurately detect. However, even if it is intended to detect the ground fault on the basis of the voltage change, the direct-current component resistance value of the output coil structuring the angular resolver is small and the change amount of the potential is small even when the direct-current component resistance value becomes zero, so that the change amount of the voltage is not distinguished from a variation of the signal potential at a normal time on the basis of the angular resolver itself, a variation of a characteristic of an electronic circuit and a temperature change. Taking into consideration a risk of a steering assist stop caused by an erroneous fail detection, the ground fault can not be actually detected.

SUMMARY OF THE INVENTION

The present invention is made for the purpose of solving the problem mentioned above, and an object of the present invention is to provide a rotating angle detecting apparatus which can detect a ground fault of an angular resolver without error, and an electric power steering apparatus.

In order to achieve the object mentioned above, there is provided a rotating angle detecting apparatus comprising:

an angular resolver 35 detecting a rotating angle and attached to a detected subject;

a direct-current offset voltage applying circuit 64A applying a direct-current offset voltage to an output from the angular resolver 35;

an A/D converter A/D converting an output from the direct-current offset voltage applying circuit 64A; and a computing unit 62 applying an exciting voltage to the angular resolver and detecting a rotating angle of the angular resolver on the basis of an output from the A/D converter, wherein the direct-current offset voltage applying circuit 64A is constituted by a differential amplifier OP1, a first resistance R1 connected between an inverting input of the differential amplifier OP1 and a reference potential, a second resistance R2 for a negative feedback connected between an output and the inverting input of the differential amplifier OP1, a third resistance R3 connected in series between the angular resolver connected to the reference potential and a non-inverting input of the differential amplifier OP1, and a fourth resistance R4 connected between an offset potential and the non-inverting input, and wherein values of the first resistance R1, the second resistance R2, the third resistance R3 and the fourth resistance R4 are set such that an output Vout of the differential amplifier OP1 becomes equal to or more than a predetermined margin for preventing an erroneous ground fault detection in the computing unit, in a difference between a minimum output potential Vout Min at a time when the angular resolver is not in a ground fault generated by a variation of the values of the first resistance R1, the second resistance R2, the third resistance R3 and the fourth resistance R4 and the direct-current resistance component of the angular resolver output coil, and a maximum potential Vout Max at a time when the angular resolver 35 is in the ground fault.

There is provided an electric power steering apparatus comprising:

a torsion bar 31 attached to a steering shaft 22;

an angular resolver 35 detecting a rotating angle corresponding to a torsion of the torsion bar;

a motor 40 assisting a steering executed by a steering mechanism connected to the steering shaft 22;

a direct-current offset voltage applying circuit 64A applying a direct-current offset voltage to an output from the angular resolver 35;

an A/D converter A/D converting an output from the direct-current offset voltage applying circuit 64A;

a torsion angle computing means 62 applying an exciting voltage to the angular resolver and computing a torsion angle of the torsion bar detected by the angular resolver on the basis of an output from the A/D converter; and a motor control means 62 determining an assist amount from the computed torsion angle so as to control the motor, wherein the direct-current offset voltage applying circuit 64A is constituted by a differential amplifier OP1, a first resistance R1 connected between an inverting input and a reference potential in the differential amplifier OP1, a second resistance R2 for a negative feedback connected between an output and the inverting input in the differential amplifier OP1, a third resistance R3 connected in series between the angular resolver connected to the reference potential and a non-inverting input of the differential amplifier OP1, and a fourth resistance R4 connected between an offset potential and the non-inverting input, and wherein values of the first resistance R1, the second resistance R2, the third resistance R3 and the fourth resistance R4 are set such that an output of the differential amplifier OP1 becomes equal to or more than a predetermined margin for preventing an erroneous ground fault detection in the computing unit, in a difference between a minimum output potential Vout Min at a time when the angular resolver is not in a ground fault generated by a variation of the values of the first resistance R1, the second resistance R2, the third resistance R3 and the fourth resistance R4 and the direct-current resistance component of the angular resolver output coil, and a maximum potential Vout Max at a time when the angular resolver 35 is in the ground fault.

In accordance with the first aspect of the present invention, the values of the first resistance R1, the second resistance R2, the third resistance R3 and the fourth resistance R4 are set such that an output of the differential amplifier becomes equal to or more than the predetermined margin for preventing the erroneous ground fault detection in the computing unit, in the difference between the minimum output potential at a time when the angular resolver is not in the ground fault which can be generated by the variation of the values of the first resistance R1, the second resistance R2, the third resistance R3 and the fourth resistance R4 and the direct-current resistance component of the angular resolver output coil, and the maximum potential at a time when the angular resolver is in the ground fault. In other words, since the difference between the minimum output potential Vout Min at a time when the angular resolver is not in the ground fault, and the maximum potential Vout Max at a time when the angular resolver is in the ground fault is equal to or more than the predetermined margin for preventing the erroneous ground fault detection, it is possible to detect the ground fault of the angular resolver on the basis of the output potential Vout of the differential amplifier without fault.

In accordance with the second aspect of the present invention, the magnification K of the third resistance R3 with respect to the direct-current resistance component of the angular resolver output coil is first determined such that the difference between the minimum output potential Vout Min at a time when the angular resolver is not in the ground fault, and the maximum potential Vout Max at a time when the angular resolver is in the ground fault becomes equal to or more than the predetermined margin. Further, the gain Gain of the differential amplifier defined such that the difference between the minimum output potential and the maximum potential becomes equal to or more than the predetermined margin is defined in the predetermined range on the basis of the value of the third resistance R3 determined by the magnification K. Further, the values of the first resistance R1, the second resistance R2 and the fourth resistance R4 are set on the basis of the gain Gain. Since the magnification K of the third resistance R3 with respect to the direct-current resistance component Rdc of the angular resolver output coil is first defined to the low level, four example, quadruple or less, the output of the differential amplifier is relatively largely changed in comparison with the time when the angular resolver is not in the ground fault, in the case that the direct-current component resistance Rdc of the angular resolver becomes zero due to the ground fault. Accordingly, it is possible to set the difference between the minimum output potential Vout Min at a time when the angular resolver is not in the ground fault, and the maximum potential Vout Max at a time when the angular resolver is in the ground fault to be equal to or more than the predetermined margin.

In accordance with the third aspect of the present invention, the values of the first resistance R1, the second resistance R2, the third resistance R3 and the fourth resistance R4 are set such that an output of the differential amplifier becomes equal to or more than the predetermined margin for preventing the erroneous ground fault detection in the computing unit, in the difference between the minimum output potential at a time when the angular resolver is not in the ground fault which can be generated by the variation of the values of the first resistance R1, the second resistance R2, the third resistance R3 and the fourth resistance R4 and the direct-current resistance component of the angular resolver output coil, and the maximum potential at a time when the angular resolver is in the ground fault. In other words, since the difference between the minimum output potential Vout Min at a time when the angular resolver is not in the ground fault, and the maximum potential Vout Max at a time when the angular resolver is in the ground fault is equal to or more than the predetermined margin for preventing the erroneous ground fault detection, it is possible to detect the ground fault of the angular resolver on the basis of the output potential Vout of the differential amplifier without fault.

BRIEF DESCRIPTION OF THE DRAWINGS

FIG. 11 is a table showing reasons by which the output Vout is varied; and

DESCRIPTION OF THE PREFERRED EMBODIMENTS

Figure 1:
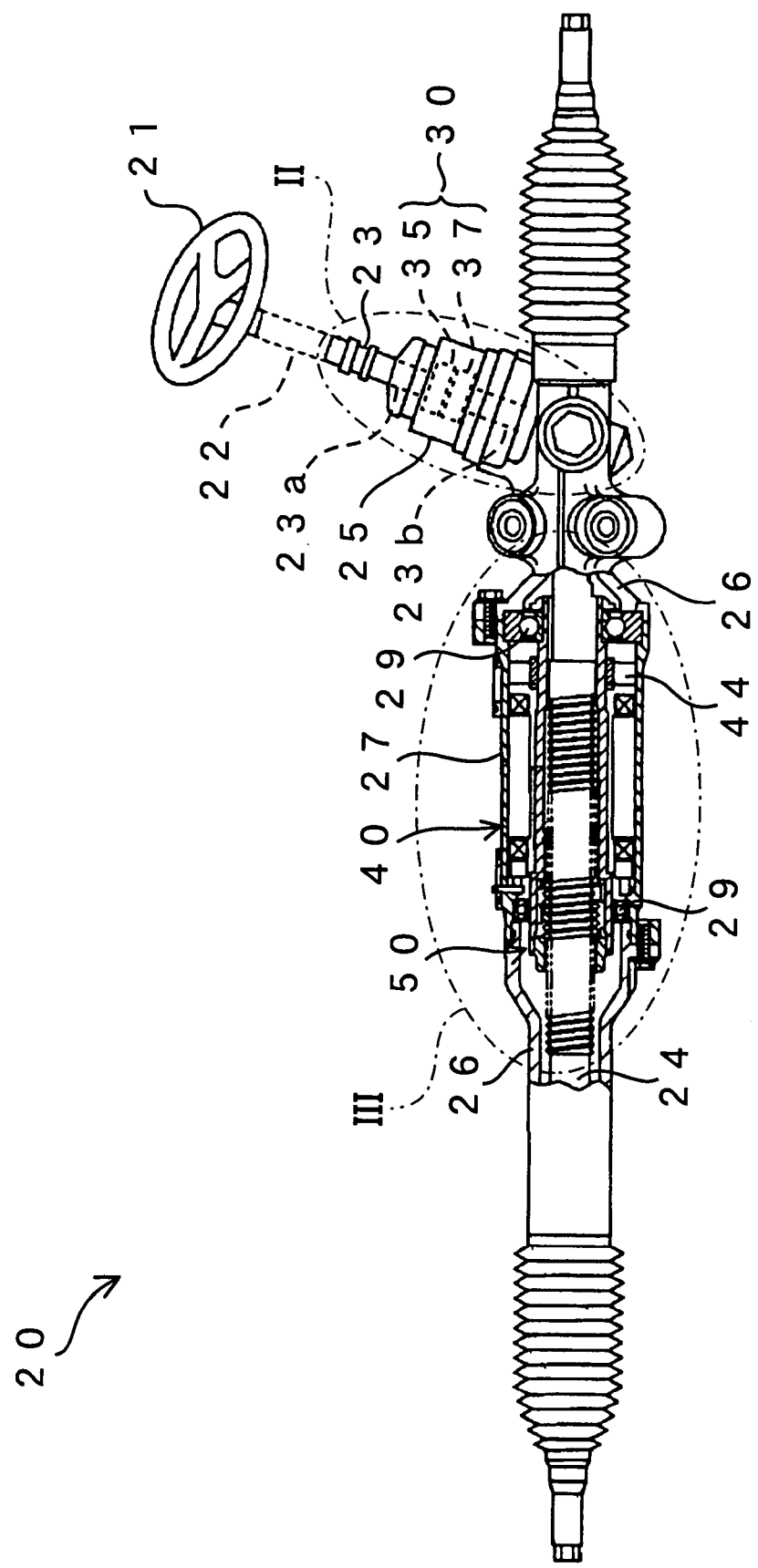
FIG. 1 is a schematic view showing a structure of an electric power steering apparatus in accordance with a first embodiment of the present invention.

A description will be given of an embodiment of an electric power steering apparatus in accordance with the present invention with reference to the accompanying drawings.

First, a description will be given of a main structure of an electric power steering apparatus 20 in accordance with the present embodiment with reference to FIGS. 1 to 4. As shown in FIGS. 1 to 4, the electric power steering apparatus 20 is mainly constituted by a steering wheel 21, a steering shaft 22, a pinion shaft 23, a rack shaft 24, a torque sensor 30, a motor 40, a motor resolver 44, a ball screw mechanism 50, an ECU 60 and the like, detects a steering state of the steering wheel 21, and generates an assist force in correspondence to the steering state by the motor 40 so as to assist a steering operation by a driver. In this case, tire wheels (not shown) are connected to both ends of the rack shaft 24 respectively via tie rods or the like.

Figure 2:
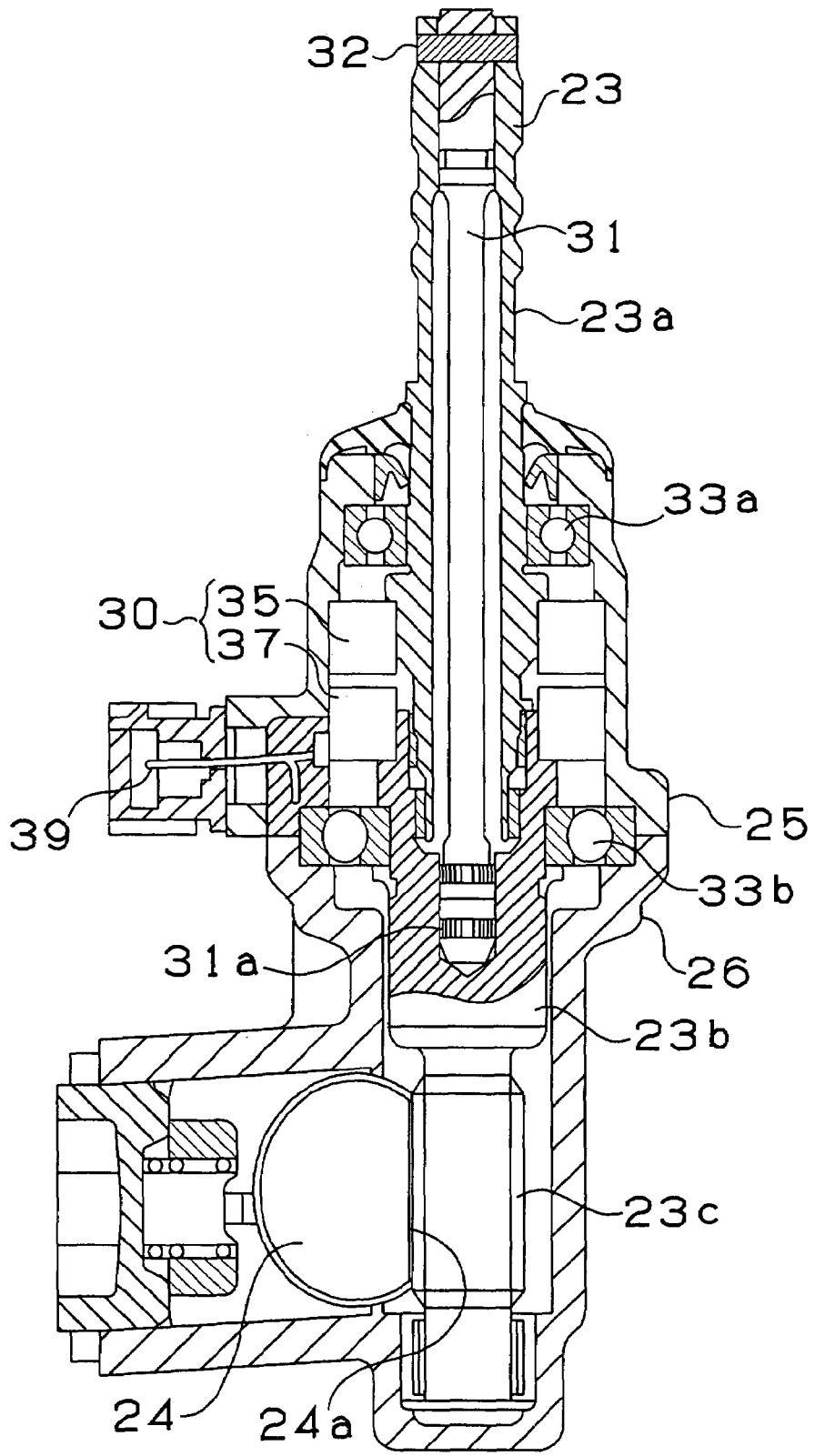
FIG. 2 is an enlarged view of an oval portion drawn by a single-dot chain line II in FIG. 1.

In other words, as shown in FIGS. 1 and 2, one end side of the steering shaft 22 is connected to the steering wheel 21, and an input shaft 23a of the pinion shaft 23 received within a pinion housing 25 and a torsion bar (an elastic member) 31 are connected to the other end side of the steering shaft 22 by a pin 32. Further, an output shaft 23b of the pinion shaft 23 is connected to the other end side 31a of the torsion bar 31.

The input shaft 23a of the pinion shaft 23 and the output shaft 23b are axially supported by a bearing 33a and a bearing 33b respectively so as to be rotatable within the pinion housing 25, a first angular resolver 35 is provided between the input shaft 23a and the pinion housing 25, and a second angular resolver 37 is provided between the output shaft 23b and the pinion housing 25, respectively. The first angular resolver 35 and the second angular resolver 37 can detect a steering angle by the steering wheel 21, and are electrically connected to the ECU 60 via a terminal 39 respectively (refer to FIG. 4).

A pinion gear 23c is formed in an end portion of the output shaft 23b of the pinion shaft 23, and a rack groove 24a of the rack shaft 24 is meshed with the pinion gear 23c. Accordingly, a rack and pinion mechanism is structured.

In accordance with the structure mentioned above, it is possible to couple the steering shaft 22 and the pinion shaft 23 by the torsion bar 31 so as to be relatively rotatable, and it is possible to detect a rotating angle of the steering shaft 22, that is, a rotating angle (a mechanical angle) θm of the steering wheel 21 on the basis of a first steering angle (an electrical angle) θe1 by the first angular resolver 35 and a second steering angle (an electric angle) θe2 by the second angular resolver 37. Further, it is possible to detect a torsion amount (corresponding to the steering torque) of the torsion bar 31 as a torsion angle on the basis of an angular difference between the first steering angle θe1 and the second steering angle θe2.

Figure 3:
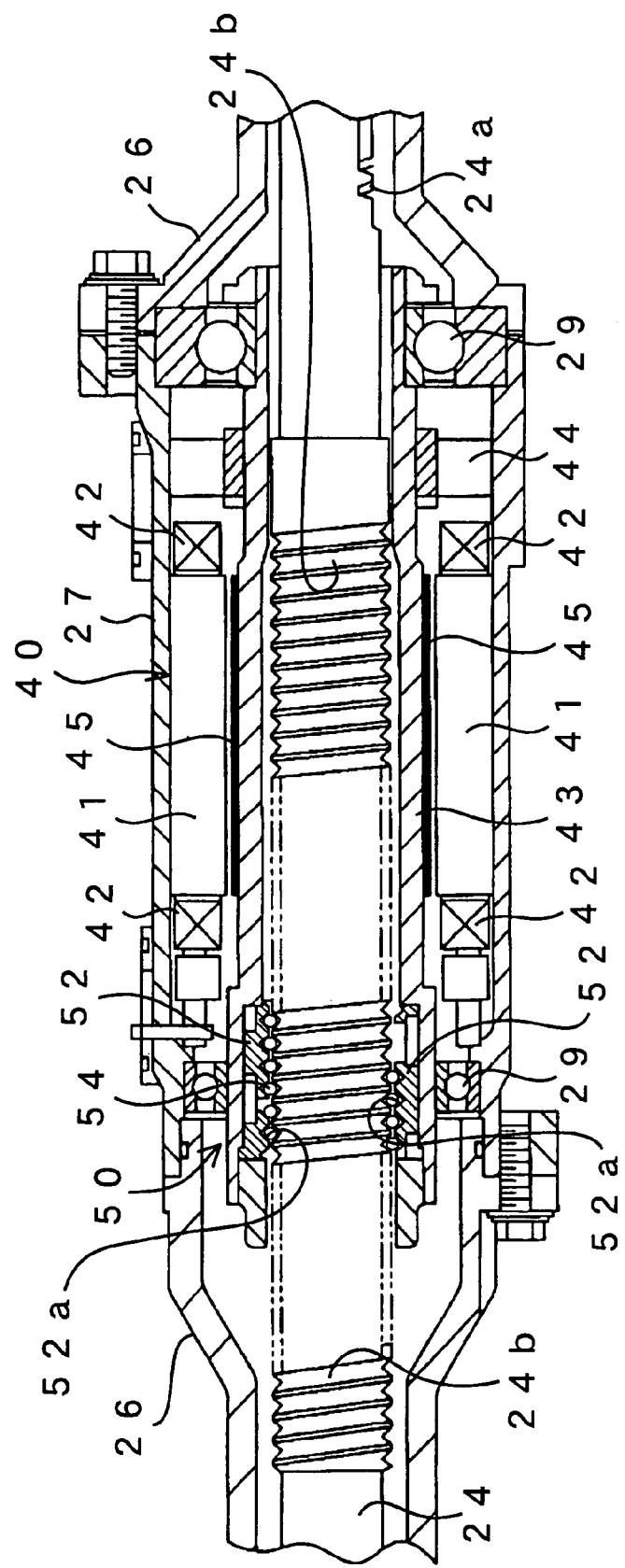
FIG. 3 is an enlarged view of an oval portion drawn by a single-dot chain line III in FIG. 1.

As shown in FIGS. 1 and 3, the rack shaft 24 is received within a rack housing 26 and a motor housing 27, and a ball screw groove 24b is spirally formed in an intermediate portion thereof. Around the ball screw groove 24b, there is provided with a cylindrical motor shaft 43 which is axially supported by a bearing 29 so as to be coaxially rotatable with the rack shaft 24. The motor shaft 43 structures the motor 40 together with a stator 41, an exciting coil 42 and the like, and is structured such that a magnetic field generated by the exciting coil 42 wound around the stator 41 acts on a permanent magnet 45 provided in an outer periphery of the motor shaft 43 corresponding to a rotor, whereby the motor shaft 43 can rotate.

A ball screw nut 52 is attached to an inner periphery of the motor shaft 43, and a ball screw groove 52a is also formed spirally in the ball screw nut 52. Accordingly, a ball screw mechanism 50 capable of moving the rack shaft 24 in an axial direction on the basis of a rotation of the motor shaft 43 can be structured by interposing a lot of balls 54 between the ball screw groove 52a of the ball screw nut 52 and the ball screw groove 24b of the rack shaft 24.

In other words, it is possible to convert a rotation torque of a rotation of the motor shaft 43 into a reciprocating motion in the axial direction of the rack shaft 24, by the ball screw mechanism 50 structured by both the ball screw grooves 24b, 52a and the like. Accordingly, the reciprocating motion forms an assist force reducing a steering force of the steering wheel 21 via the pinion shaft 23 structuring the rack and pinion mechanism together with the rack shaft 24.

Figure 4:
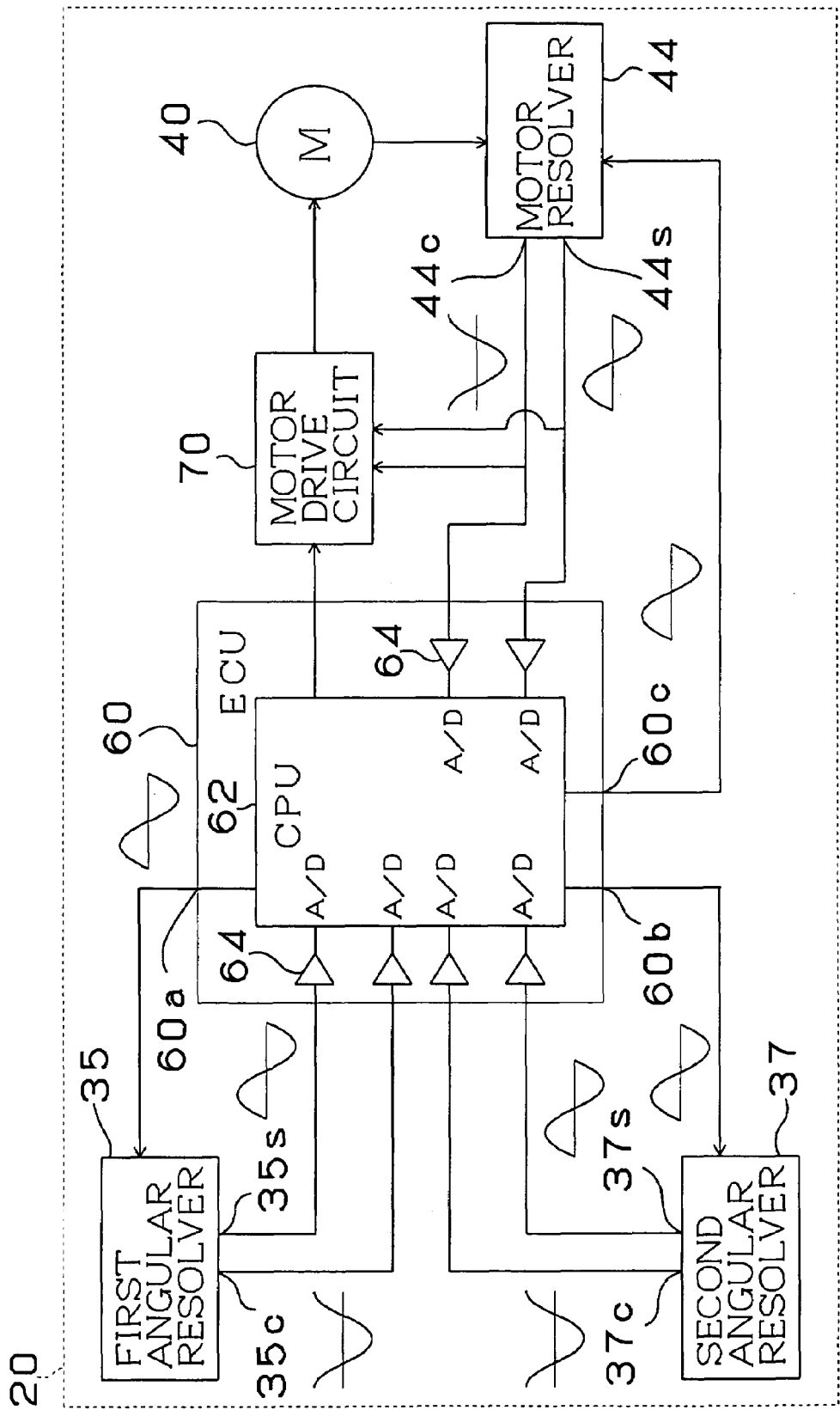
FIG. 4 is a block diagram showing a connecting structure between an ECU controlling the electric power steering apparatus in accordance with the present embodiment and an angular resolver.

In this case, the motor resolver 44 which can detect a rotating angle (an electric angle) θMe of the motor shaft 43 is provided between the motor shaft 43 of the motor 40 and the motor housing 27, and the motor resolver 44 is electrically connected to the ECU 60 via a terminal (not shown) (refer to FIG. 4).

FIG. 4 shows a control structure of an electric power steering apparatus 20 in accordance with a first embodiment. The ECU 60 gives an exciting signal to the first angular resolver 35, the second angular resolver 37 and the motor resolver 44 from output ports 60a, 60b and 60c. A sin phase output from a sin output terminal 35s of the first angular resolver 35, a cos phase output from a cos output terminal 35c, a sin phase output from a sin output terminal 37s of the second angular resolver 37, and a cos phase output from a cos output terminal 37c are input to the ECU 60 of the electric power steering apparatus 20. A direct-current offset voltage is applied to each of the sin phase outputs and the cos phase outputs via a buffer 64 of the ECU 60, and each of the sin phase outputs and the cos phase outputs is input to an A/D converter side of the CPU 62, and is A/D converted. The CPU 62 detects rotating angles of the first angular resolver 35 and the second angular resolver 37 from the A/D converted sin phase outputs and cos phase outputs so as to compute a steering torque T, and outputs an assist command for assisting the steering force in correspondence to the steering torque T to a motor drive circuit 70 side. The motor drive circuit 70 generates a torque in correspondence to the assist command in the motor 40. The rotating angle of the motor 40 is detected by the motor resolver 44, and a sin phase output from a sin output terminal 44s and a cos phase output from a cos output terminal 44c are fed back to the motor drive circuit 70, and are also output to the ECU 60. The ECU 60 computes respective steering angles on the basis of the outputs from the first angular resolver 35, the second angular resolver 37 and the motor resolver 44, compensates the assist amount of the steering force mentioned above in correspondence to the steering angle, and detects a ground fault of the angular resolvers.

In this case, a description will be given of structures of the first angular resolver 35, the second angular resolver 37 and the motor resolver 44 with reference to FIG. 5A. In this case, since these resolvers have approximately the same structure, common parts will be described by the first angular resolver 35 as a representative.

Figure 5A:
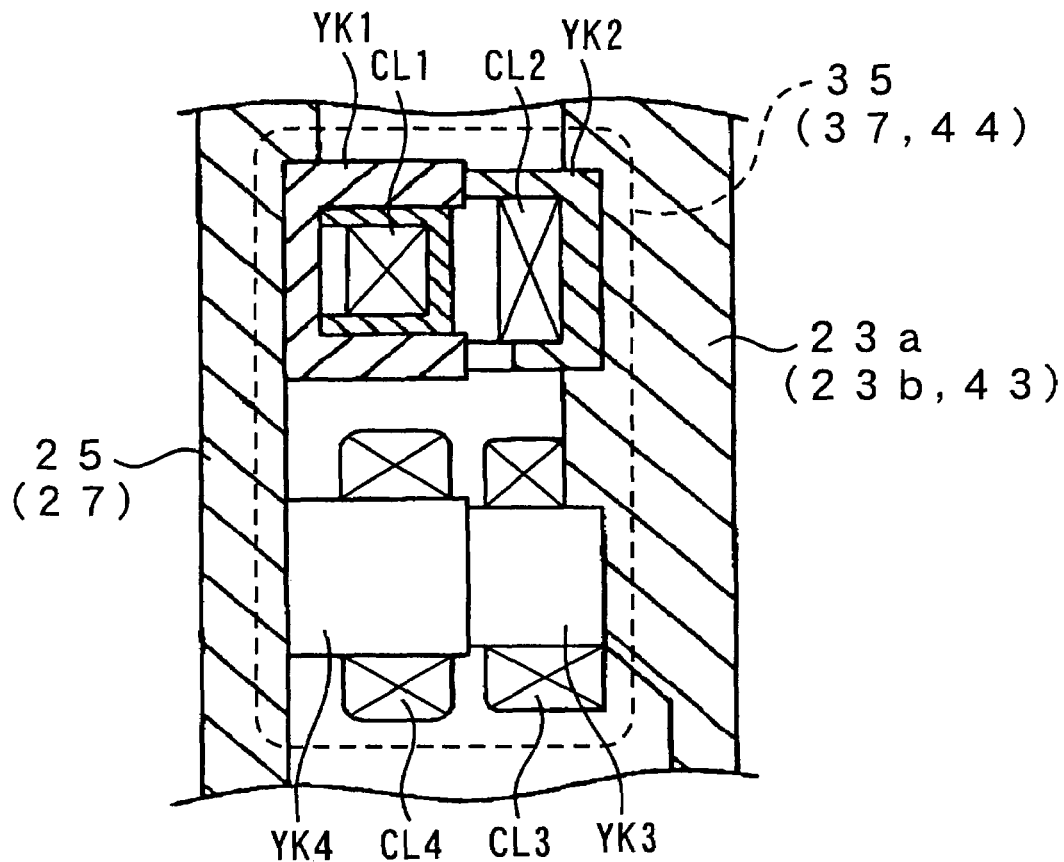
FIG. 5A is an explanatory view showing a structure of an angular resolver used in an electric power steering apparatus in accordance with the first embodiment.

As shown in FIG. 5A, the first angular resolver 35 is an angular resolver structured by a first yoke YK1, a second yoke YK2, a third yoke YK3, a fourth yoke YK4, a first coil CL1, a second coil CL2, a third coil CL3 and a fourth coil CL4.

The first yoke YK1 is formed in an annular shape along an inner periphery of the pinion housing 25, and is fixed to the pinion housing 25. Further, the first coil CL1 is wound around an inner periphery of the first yoke YK1. On the other hand, the second yoke YK2 is formed in an annular shape in the same manner as that of the first yoke YK1, is fixed to an outer periphery of the input shaft 23a of the pinion shaft 23 so as to oppose to the first yoke YK1, and the second coil CL2 is wound around the second yoke YK2. Accordingly, the second yoke YK2 can integrally rotate with the input shaft 23a.

The third yoke YK3 is fixed on an outer periphery of the input shaft 23a so as to be shifted in an axial direction of the input shaft 23a from the second yoke YK2, and is structured such as to be integrally rotatable with the input shaft 23a. The third coil CL3 is wound around the third yoke YK3, and the third coil CL3 is electrically connected to the second coil CL2 of the second yoke YK2 in serial. On the other hand, the fourth yoke YK4 is formed in an annular shape along the inner periphery of the housing 25 in the same manner as that of the first yoke YK1, and is fixed to the pinion housing 25. In this case, the fourth coil CL4 is constituted by two kinds of coils in which phases are shifted at 90 degrees.

In this case, the second angular resolver 37 is structured in the same manner as the first angular resolver 35 except a point that the second yoke YK2, the third yoke YK3, the second coil CL2 and the third coil CL3 are provided in the output shaft 23b as is different from the first angular resolver 35.

Further, the motor resolver 44 is structured in the same manner as the first angular resolver 35 except a point that the first yoke YK1, the fourth yoke YK4, the first coil CL1 and the fourth coil CL4 are provided in the motor housing 27, and a point that the second yoke YK2, the third yoke YK3, the second coil CL2 and the third coil CL3 are provided in the motor shaft 43 as is different from the first angular resolver 35.

Next, a description will be given of electric characteristics of the first angular resolver 35, the second angular resolver 37 and the motor resolver 44 on the basis of FIG. 5B. In this case, since these resolvers have approximately the same electric characteristic, the first angular resolver 35 is described as a representative.

Figure 5B:
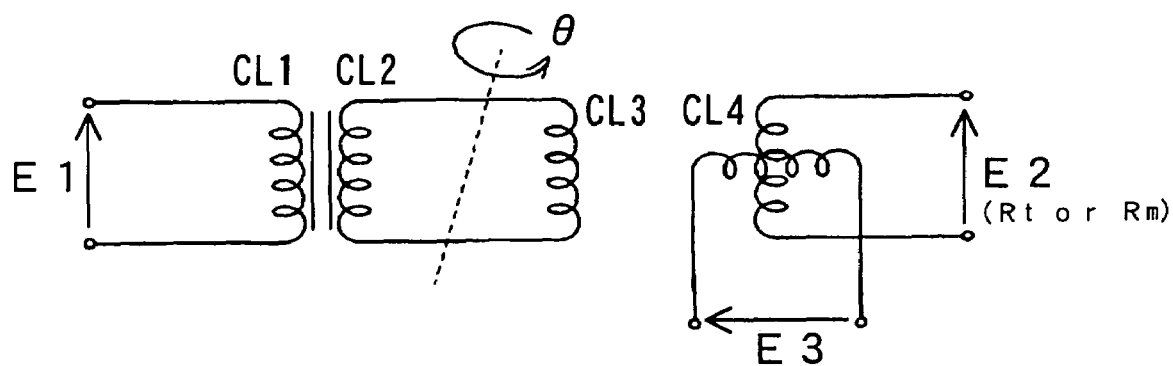
FIG. 5B is a circuit diagram of the angular resolver.

The first angular resolver 35 is constituted by the first coil CL1 to the fourth coil CL4 as mentioned above, and is a so-called one-phase exciting and two-phase output (voltage detecting) type angular resolver having a connection relation of the coils as shown in the circuit diagram of FIG. 5B. Accordingly, it is possible to obtain angular resolver output signals E2 (a sin phase output in FIG. 4) and E3 (a cos phase output in FIG. 4) in correspondence to a detecting angle θ (an electric angle) from the fourth coil CL4 corresponding to the two-phase output coil, by applying an exciting signal E1 output from the output port 60a of the ECU 60 to the first coil CL1 and the second coil CL2 serving as a transformer, and applying to the third coil CL3 corresponding to the one-phase exciting coil. Further, since the angular resolver output signal E2 or E3 output from the first angular resolver 35 mentioned above is an analogue alternating-current signal structured by the sin phase signal and the cos phase signal, the direct-current offset voltage is applied via the buffer 64 of the ECU 60 as shown in FIG. 4, is thereafter input to the A/D converter side of the CPU 62 and is A/D converted, thereby being converted into a digital signal which can be processed by the CPU 62.

A description will be given of the structure of the buffer 64 applying the direct-current offset voltage to the sin phase signal and the cos phase signal with reference to FIGS. 6A and 6B.

Figure 6A:
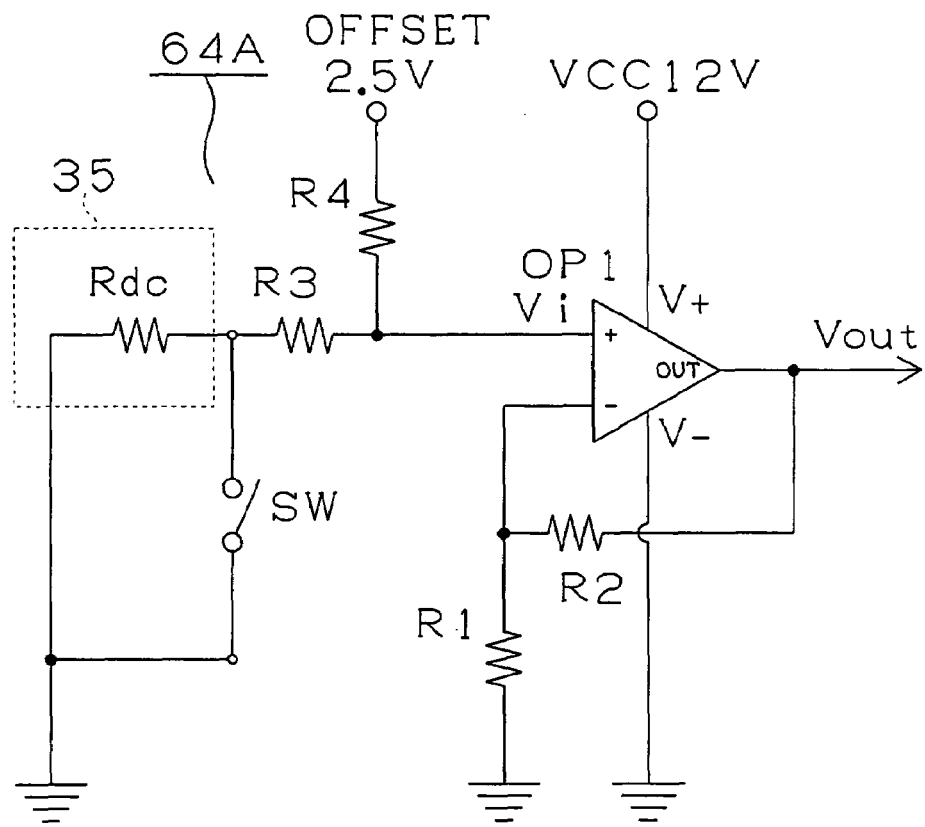
FIG. 6A is a circuit diagram of a direct-current offset voltage applying circuit.
Figure 6B:
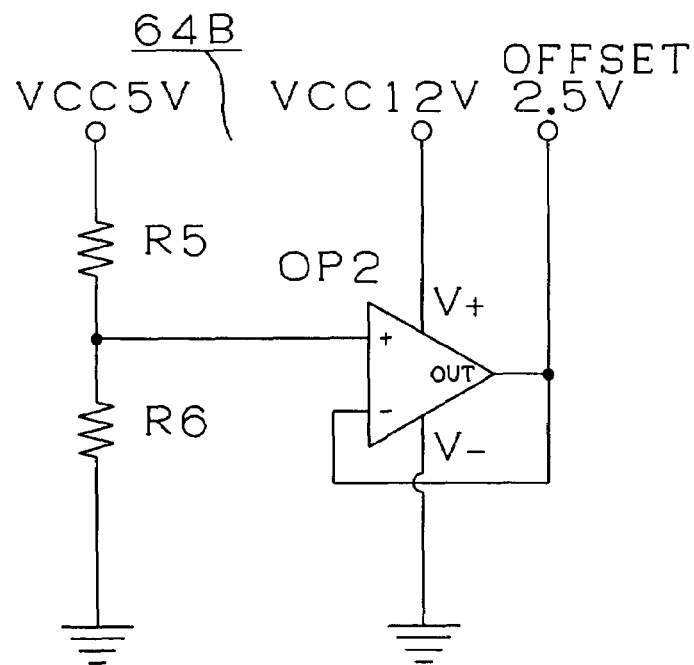
FIG. 6B is a circuit diagram of an offset voltage generating circuit.

The buffer 64 is constituted by a direct-current offset voltage applying circuit 64A applying a direct-current offset voltage to the sin phase signal of the first angular resolver 35 shown in FIG. 6A, and an offset voltage generating circuit 64B generating an offset voltage (2.5 V) for the direct-current offset voltage applying circuit 64A shown in FIG. 6B.

The direct-current offset voltage applying circuit 64A is constituted by a first differential amplifier OP1, a first resistance R1 connected between an inverting input of the first differential amplifier OP1 and a ground earth (a reference potential), a second resistance R2 for a negative feedback connected between an output and the inverting input of the first differential amplifier OP1, a third resistance R3 connected in series between the angular resolver 35 connected to the ground earth (the reference potential) and a non-inverting input of the first differential amplifier OP1, and a fourth resistance R4 connected between an offset potential and the non-inverting input. In the drawing, a direct-current resistance component of the output coil in the angular resolver 35 is shown by reference symbol Rdc.

The offset voltage generating circuit 64B is constituted by a second differential amplifier OP2, and a fifth resistance R5 and a sixth resistance R6 which divide a voltage of a power source Vcc (5 V). The sixth resistance R6 is connected to the ground earth, a potential divided by the fifth resistance R5 and the sixth resistance R6 is connected to a non-inverting input of the second differential amplifier OP2, and an output of the second differential amplifier OP2 is connected to an inverting input so as to be negative fed back. In this case, 2.5 V (the offset voltage) corresponding to a half of the power source Vcc (5V) is output from the second differential amplifier OP2 by making values of the fifth resistance R5 and the sixth resistance R6 equal to each other.

A DC voltage calculating expression of the output Vout of the direct-current offset voltage applying circuit 64A is shown below.

In this case, an applied voltage Vi to the non-inverting input of the first differential amplifier OP1 can be expressed by the following expression.

$$Vi = OFFSET \times (Rdc+R3)/(Rdc+R3+R4)$$

The output Vout can be expressed by the following expression.

$$Vout = Vi \times (R2+R1)/R1$$

Accordingly, Vout={OFFSET×(Rdc+R3)/(Rdc+R3+R4)}×(R2+R1)/R1

$$Vout = \{5.0 \times R6/(R5+R6) \times (Rdc+R3)/(Rdc+R3+R4) \times (R2+R1)/R1 \quad \text{Expression 1}$$

In this case, on the assumption of the condition (a) R5=R6, (b) R1=R3 and (c) R2=R4, since the direct resistance component Rdc of the angular resolver 35 becomes 0 at a disconnection time (a connection state of a hypothetical switch SW in FIG. 6A), Vout equals to 2.5 [V].

In accordance with the first embodiment, it is possible to accurately detect the ground fault from the output Vout by making a magnification K of a resistance value of the third resistance R3 smaller in comparison with Rdc (about 30Ω) and shifting the output Vout at a normal time from 2.5 V.

On the assumption that the relation R4/R3=R1/R2=Gain is established in the expression 1, the expression can be expressed as follows.

$$Vout = OFFSET \times (1 + R4/(R3+Rdc))^{-1} \times (1 + R2/R1)$$
$$= OFFSET \times (1 + (R3 \cdot Gain)/(R3+Rdc))^{-1} \times (1 + Gain)$$

On the assumption that the resistance value of the third resistance R3 is set to the magnification K with respect to Rdc (about 30Ω) as mentioned above, it is possible to introduce a condition for allowing the ground fault to be detected by two variables, that is the magnification K and Gain.

Figure 10:
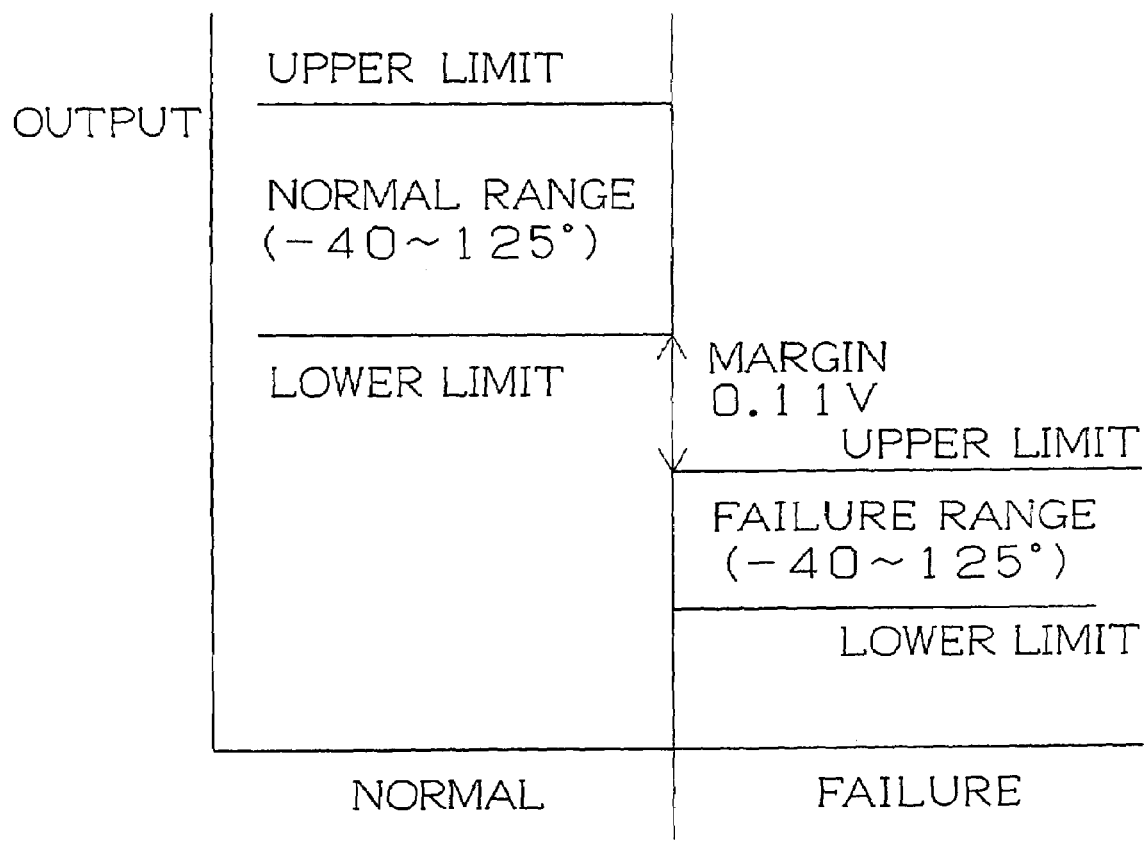
FIG. 10 is a graph showing a voltage range (from an upper limit to a lower limit) of an output Vout at a normal time (Rdc≠0) capable of detecting the ground fault and a voltage range (from an upper limit to a lower limit) of an output Vout at a ground fault time (Rdc=0)

In this case, allowing the ground fault to be detected means that the voltage range (from the upper limit to the lower limit) of the output Vout at the normal time (Rdc≠0) and the voltage range (from the upper limit to the lower limit) of the output Vout at the ground fault time (Rdc=0), that is, the voltage range (the lower limit) of the output Vout at the normal time and the voltage range (the upper limit) of the output Vout at the ground fault time do not overlap while securing a predetermined margin (for example, 0.11 V), as shown in FIG. 10. In other words, it means that even if the constituting parts having the worst characteristics are combined, it is possible to secure the predetermined margin (for example, 0.11 V) in all the temperature (−40 to 125 degree), and it is possible to separate the normal and the ground fault. In this case, a breakdown of 0.11 V is obtained by adding an error 0.01 V at a time of the A/D conversion to a noise 0.10 V generated in the motor vehicle.

The upper limit (Vout Max) and the lower limit (Vout Min) of the output Vout is determined by the following expression.

$$Vout = \{5.0 \times (1+R5/R6)^{-1} \times (1+R4/(R3+Rdc))^{-1}\} \times (1+R2/R1) \quad \text{Expression 2}$$

A reason why the output Vout is dispersed is shown in FIG. 11. In accordance with expression 2, each of the lower limit (Vout min) of the output Vout at the normal time and upper limit (Vout max) of the output Vout at the ground fault time is expressed by two variables, i.e. the magnification K and Gain, with considering the upper limit value and the lower limit value of each of the constituting members.

Figure 7:
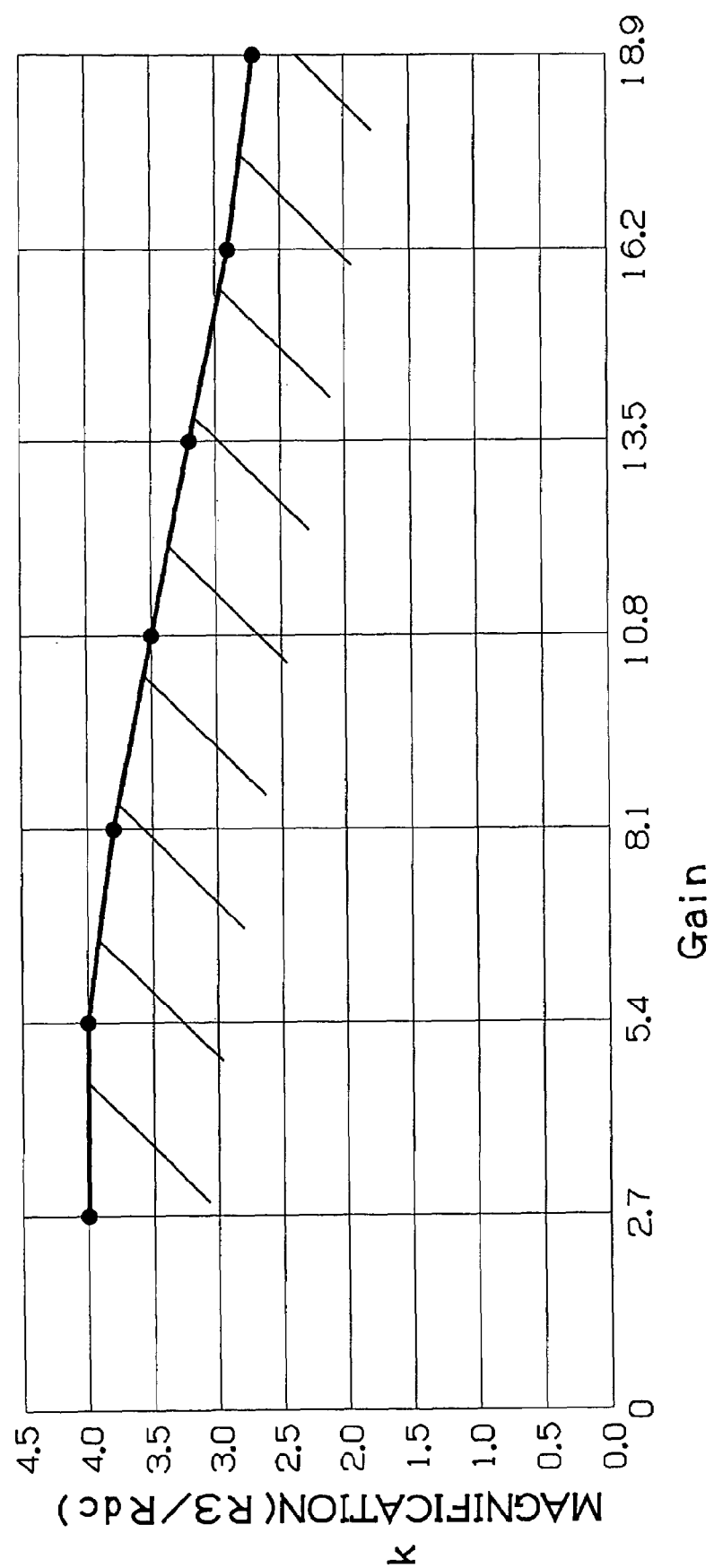
FIG. 7 is a graph showing a range in which a voltage range (a lower limit) of an output Vout at a normal time and a voltage range (an upper limit) of an output Vout at a ground fault time can secure a predetermined margin (0.11 V) by two variables comprising a magnification K and Gain.

Therefore, shown in FIG. 7 is the relation between the magnification K and Gain which is capable of securing the predetermined margin (for example, 0.11 V) between the voltage range (the lower limit) of the output Vout at the normal time and the voltage range (the upper limit) of the output Vout at the ground fault time. In this case, in the first embodiment, it is assumed that the relation R4/R3=R1/R2 is established. For example, when Gain is 2.7, in the case that the magnification K is equal to or less than 4.0, that is, the resistance value of the third resistance R3 is set to be equal to or less than 120Ω, it is possible to secure the predetermined margin (0.11 V), and it is possible to detect the ground fault. In the same manner, when Gain is 10.8, in the case that the magnification K is equal to or less than 3.5, that is, the resistance value of the third resistance R3 is set to be equal to or less than 105Ω, it is possible to secure the predetermined margin.

Figure 8:
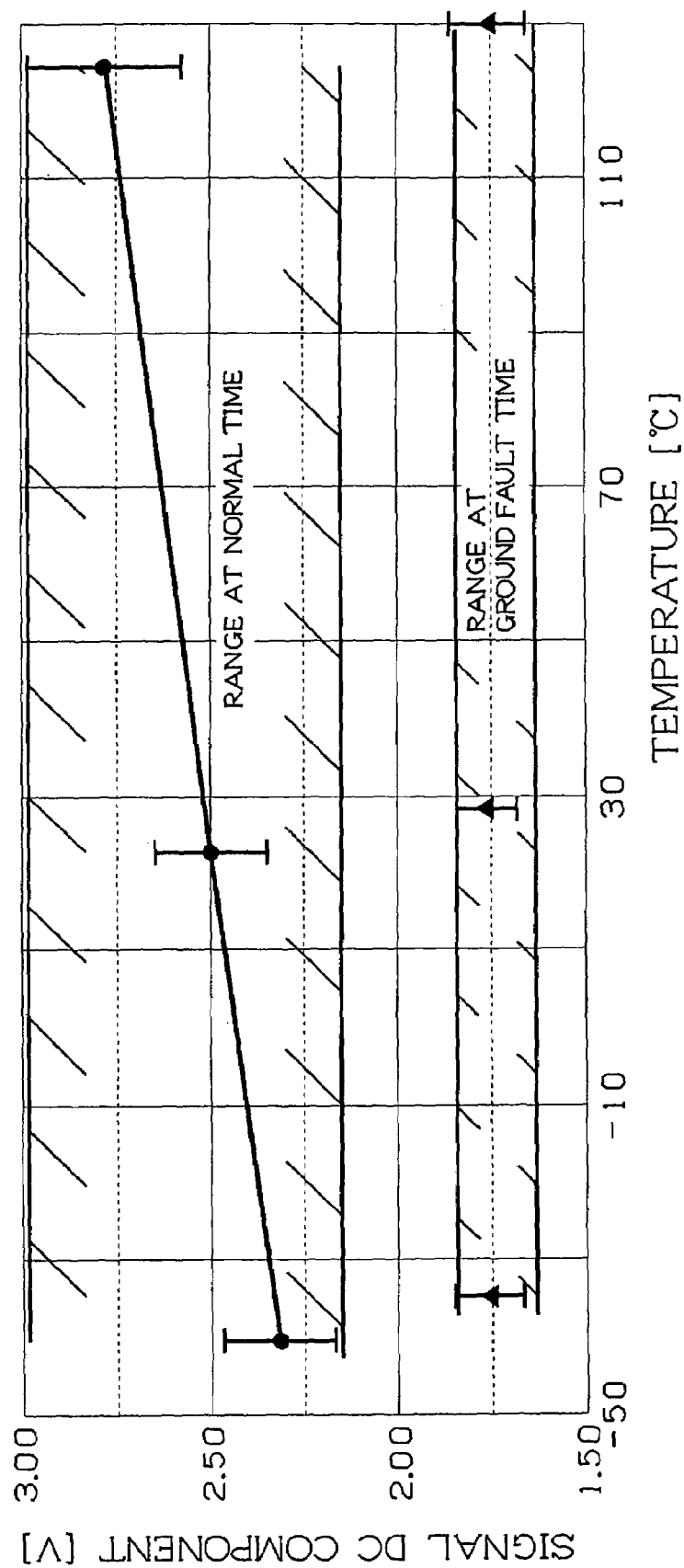
FIG. 8 is a graph showing a voltage range of an output Vout at a normal time and a voltage range of an output Vout at a ground fault time in accordance with a temperature change in the case of setting K=2 and Gain=8.1.

FIG. 8 shows the voltage range (from the upper limit to the lower limit) of the output Vout at the normal time and the voltage range (from the upper limit to the lower limit) of the output Vout at the ground fault time in accordance with the temperature change, in the case that the relation K=2 and Gain=8.1 is set in the embodiment. Since the condition expressed in FIG. 7 is established, it is possible to always secure the predetermined margin (for example, 0.11 V). In this case, the voltage range of the output Vout at the normal time is widely changed in accordance with the temperature because the temperature change includes the direct-current resistance component Rdc of the angular resolver 35 having the great temperature change. In this case, in the magnification K, it is preferable to set the larger value within the range capable of detecting the ground fault because an amount of the offset current flowing to the ground earth side via the angular resolver becomes small and the offset voltage generating circuit 64B can be made small.

Figure 9:
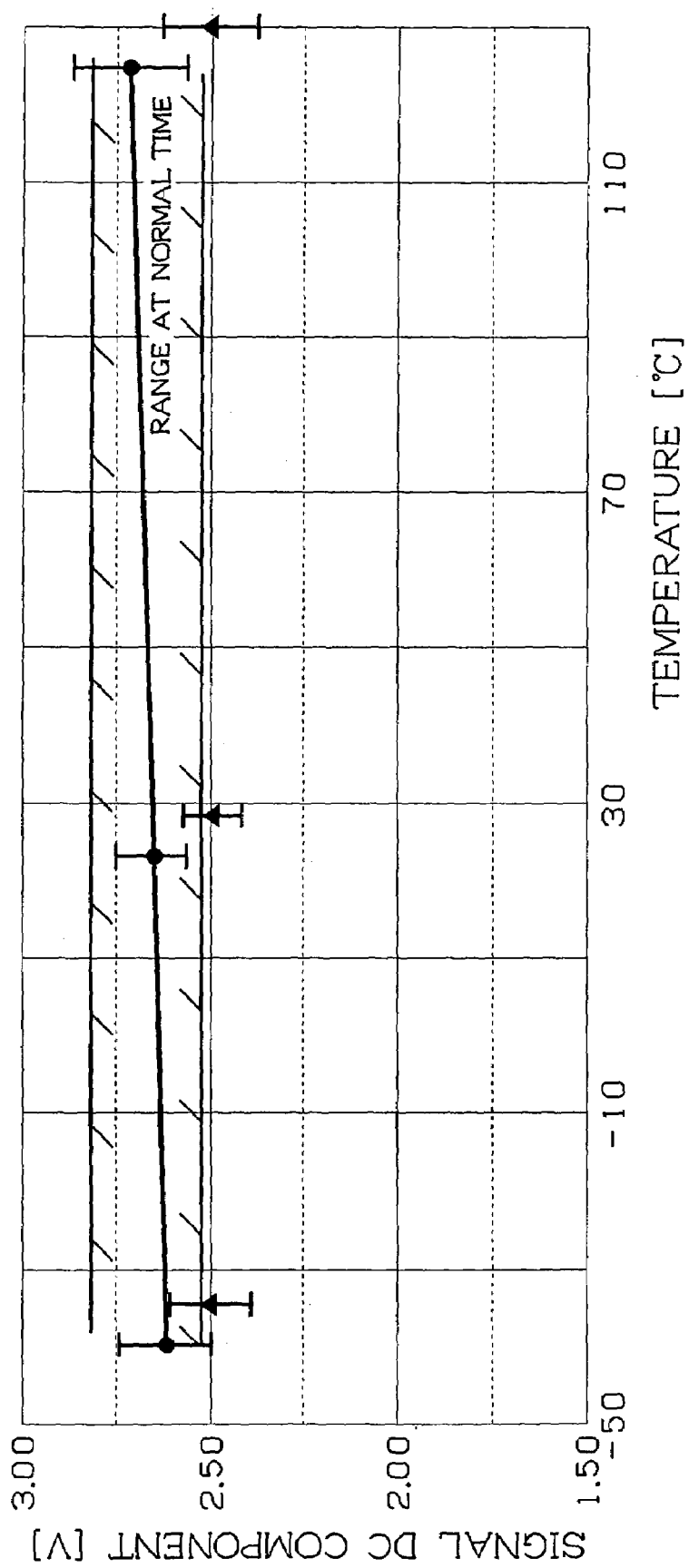
FIG. 9 is a graph showing a voltage range of an output Vout at a normal time and a voltage range of an output Vout at a ground fault time in accordance with a temperature change in the case of setting K=11 and Gain=2.7 in the embodiment.

On the other hand, FIG. 9 shows the voltage range (from the upper limit to the lower limit) of the output Vout at the normal time and the voltage range (from the upper limit to the lower limit) of the output Vout at the ground fault time in accordance with the temperature change, at time of setting the relation K=11 and Gain=2.7. Since the condition expressed in FIG. 7 is not established, it is known that the voltage ranges of the output Vout at the normal time and the output Vout at the ground fault time are overlapped, and the ground fault can not be detected.

Figure 12:
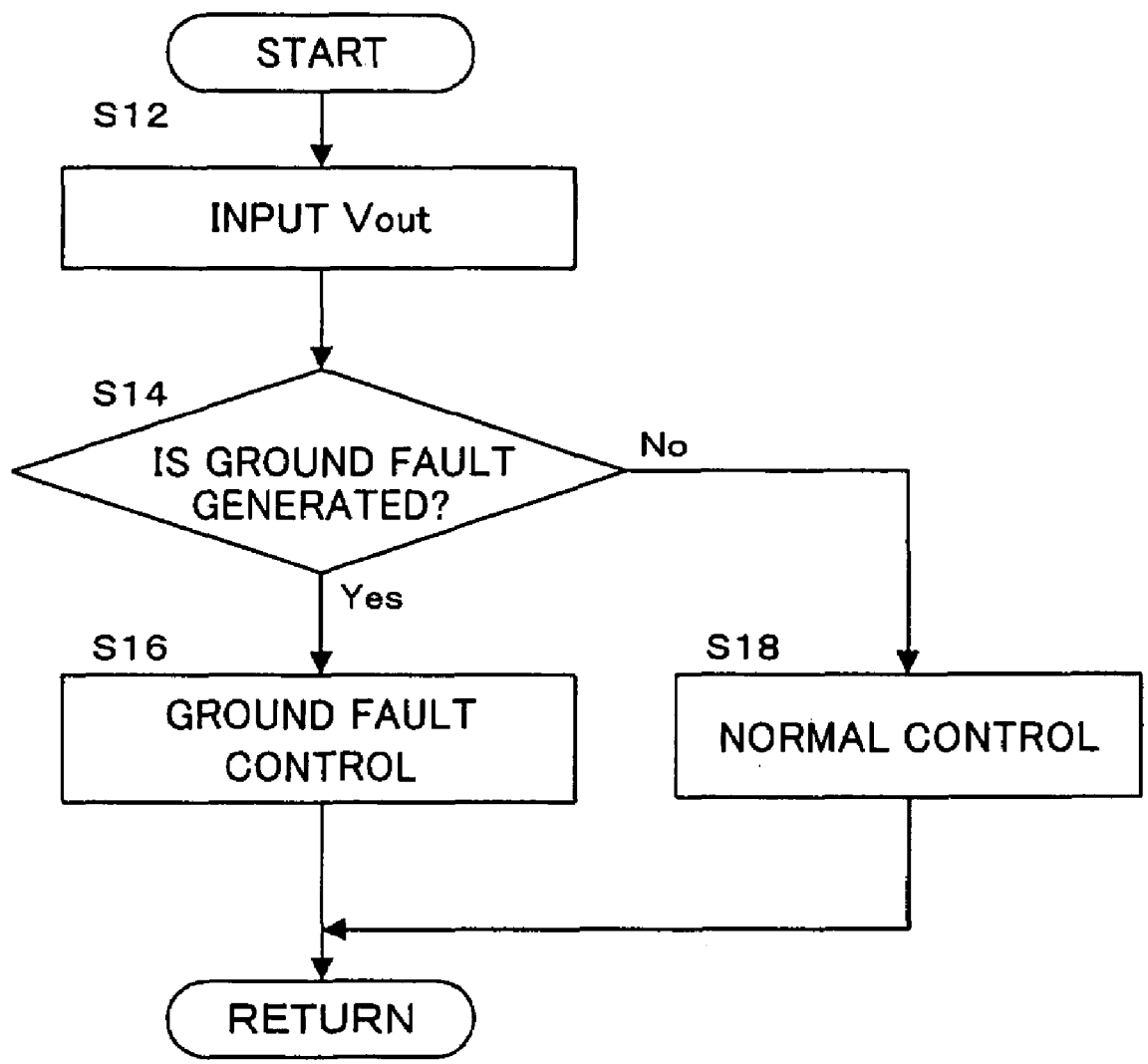
FIG. 12 is a flow chart showing a control at a normal time and a ground fault time by the ECU of the electric power steering apparatus in accordance with the first embodiment.

A description will be given of the control at the normal time and the ground fault time by the ECU 60 of the electric power steering apparatus in accordance with the first embodiment with reference to FIG. 12.

First, the sin phase signal and the cos phase signal from each of the resolvers 35, 37 and 44 are input via the buffer 64 (S12), and it is determined from the output Vout whether or not the ground fault is generated (S14). When the ground fault is not generated (No in S14), the step executes the normal control, that is, the assist of the steering in correspondence to the detected rotating angle (S18). In this case, the motor 40 is controlled by computing the torsion angle of the torsion bar 31 on the basis of the difference between the rotating angle detected by the first angular resolver 35 and the rotating angle detected by the second angular resolver 37 and determining the assist amount on the basis of the computed torsion angle. On the other hand, when the ground fault is generated in any one of the first angular resolver 35, the second angular resolver 37 and the motor resolver 44 (Yes in S14), the step executes the control at the ground fault time, that is, the assist of the steering in correspondence to the most recent rotating angle in the past data stored as the normal value, and reduces the assist amount gradually to zero (S16).

In the first embodiment, the magnification K of the third resistance R3 with respect to the direct-current resistance component Rdc of the resolver output coil is determined in such a manner that the difference between the minimum output potential Vout Min at a time when the angular resolver is not in the ground fault and the maximum potential Vout Max at a time when the angular resolver is in the ground fault becomes equal to or more than the predetermined margin. Further, the gain Gain of the differential amplifier determined such that the difference between the minimum output potential and the maximum potential becomes equal to or more than the predetermined margin is within the predetermined range, on the basis of the value of the third resistance R3 determined by the magnification K. Further, the values of the first resistance R1, the second resistance R2 and the fourth resistance R4 are set on the basis of the gain Gain. In preferable, it is possible to stably operate the differential amplifier by setting the relation R4/R3=R1/R2. First, the output of the differential amplifier is relatively largely changed with respect to the time when the angular resolver is not in the ground fault at a time when the direct-current resistance Rdc of the angular resolver becomes zero due to the ground fault, by defining the magnification K of the third resistance R3 with respect to the direct resistance component Rdc of the resolver output coil to the law level, for example, quadruple or less. Accordingly, it is possible to set the difference between the minimum output potential Vout Min at a time when the angular resolver is not in the ground fault and the maximum potential at the ground fault time of the angular resolver to the predetermined margin or more.

In other words, in the first embodiment, the values of the first resistance R1, the second resistance R2, the third resistance R3 and the fourth resistance R4 are set such that the difference between the minimum output potential Vout Min of the first differential amplifier OP1 at a time when the angular resolver is not in the ground fault time of the angular resolver which may be generated on the basis of the dispersion of the values of the first resistance R1, the second resistance R2, the third resistance R3 and the fourth resistance R4, and the direct-current resistance component Rdc of the resolver output coil, and the maximum potential Vout Max of the first differential amplifier OP1 at the ground fault time of the angular resolver becomes equal to or more than the predetermined margin (for example, 0.11 V) for preventing the erroneous ground fault detection in the CPU 62 side. In other words, since the difference between the minimum output potential Vout Min at a time when the angular resolver is not in the ground fault, and the maximum potential Vout Max at a time when the angular resolver is in the ground fault is equal to or more than the predetermined margin for preventing the erroneous ground fault detection, it is possible to detect the ground fault of the angular resolver on the basis of the output potential Vout of the first differential amplifier OP1 in the CPU 62 side without fault.

The embodiment mentioned above is exemplified by the rotating angle of the steering shaft of the electric power steering apparatus, the torsion angle of the torsion bar, and the ground fault detection of the angular resolver used for detecting the rotation of the motor. However, the structure of the present invention can be applied to a rotating angle detecting apparatus using various angular resolvers. Further, in the embodiment mentioned above, the output of the buffer 64 is A/D converted, however, the ground fault detection can be executed by comparing with a threshold value using a comparator in place of the A/D conversion.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A rotating angle detecting apparatus comprising:
an angular resolver detecting a rotating angle and attached to a detected subject;
a direct-current offset voltage applying circuit applying a direct-current offset voltage to an output from the angular resolver;
an A/D converter A/D converting an output from the direct-current offset voltage applying circuit; and
a computing unit applying an exciting voltage to the angular resolver and detecting a rotating angle of the angular resolver on the basis of an output from the A/D converter,
wherein the direct-current offset voltage applying circuit comprises a differential amplifier, a first resistance connected between an inverting input of the differential amplifier and a reference potential, a second resistance for a negative feedback connected between an output and the inverting input of the differential amplifier, a third resistance connected in series between the angular resolver connected to the reference potential and a non-inverting input of the differential amplifier, and a fourth resistance connected between an offset potential and the non-inverting input,
wherein values of the first resistance, the second resistance, the third resistance and the fourth resistance are set such that an output of the differential amplifier becomes equal to or more than a predetermined margin for preventing an erroneous ground fault detection in the computing unit, in a difference between a minimum output potential at a time when the angular resolver is not in a ground fault generated by a variation of the values of the first resistance, the second resistance, the third resistance and the fourth resistance and the direct-current resistance component of the angular resolver output coil, and a maximum potential at a time when the angular resolver is in the ground fault,
wherein a magnification of said third resistance with respect to a direct-current resistance component of said resolver output coil is determined in such a manner that a difference between said minimum output potential and said maximum potential becomes equal to or more than said predetermined margin, and
wherein values of said first resistance, the second resistance and the fourth resistance are set in such a manner that a gain of said differential amplifier defined such that the difference between said minimum output potential and said maximum potential becomes equal to or more than said predetermined margin becomes in a predetermined range, on the basis of the value of the third resistance determined by said magnification.

2. The rotating angle detecting apparatus according to claim 1, wherein said predetermined margin is at least equal to a sum of an error in the A/D converter and a background noise level.

3. The rotating angle detecting apparatus according to claim 1, wherein values of the first resistance, the second resistance, the third resistance and the fourth resistance are set such that throughout a temperature range between −40° C. and 125° C. an output of the differential amplifier becomes equal to or more than the predetermined margin for preventing an erroneous ground fault detection in the computing unit.

4. The rotating angle detecting apparatus according to claim 3, wherein said predetermined margin is at least equal to a sum of an error in the A/D converter and a background noise level.

5. An electric power steering apparatus comprising:
a torsion bar attached to a steering shaft;
an angular resolver detecting a rotating angle corresponding to a torsion of the torsion bar;
a motor assisting a steering executed by a steering mechanism connected to the steering shaft;
a direct-current offset voltage applying circuit applying a direct-current offset voltage to an output from the angular resolver;
an A/D converter A/D converting an output from the direct-current offset voltage applying circuit;
a torsion angle computing means applying an exciting voltage to the angular resolver and computing a torsion angle of the torsion bar detected by the angular resolver on the basis of an output from the A/D converter; and
a motor control means determining an assist amount from the computed torsion angle so as to control the motor,
wherein the direct-current offset voltage applying circuit is constituted by a differential amplifier, a first resistance connected between an inverting input and a reference potential in the differential amplifier, a second resistance for a negative feedback connected between an output and the inverting input in the differential amplifier, a third resistance connected in series between the angular resolver connected to the reference potential and a non-inverting input of the differential amplifier, and a fourth resistance connected between an offset potential and the non-inverting input,
wherein values of the first resistance, the second resistance, the third resistance and the fourth resistance are set such that an output of the differential amplifier becomes equal to or more than a predetermined margin for preventing an erroneous ground fault detection in the computing unit, in a difference between a minimum output potential at a time when the angular resolver is not in a ground fault generated by a variation of the values of the first resistance, the second resistance, the third resistance and the fourth resistance and the direct-current resistance component of the angular resolver output coil, and a maximum potential at a time when the angular resolver is in the ground fault,
wherein a magnification of said third resistance with respect to a direct-current resistance component of said resolver output coil is determined in such a manner that a difference between said minimum output potential and said maximum potential becomes equal to or more than said predetermined margin, and
wherein values of said first resistance, the second resistance and the fourth resistance are set in such a manner that a gain of said differential amplifier defined such that the difference between said minimum output potential and said maximum potential becomes equal to or more than said predetermined margin becomes in a predetermined range, on the basis of the value of the third resistance determined by said magnification.

6. The rotating angle detecting apparatus according to claim 5, wherein said predetermined margin is at least equal to a sum of an error in the A/D converter and a background noise level.

7. The rotating angle detecting apparatus according to claim 5, wherein values of the first resistance, the second resistance, the third resistance and the fourth resistance are set such that throughout a temperature range between −40° C. and 125° C. an output of the differential amplifier becomes equal to or more than the predetermined margin for preventing an erroneous ground fault detection in the computing unit.

8. The rotating angle detecting apparatus according to claim 7, wherein said predetermined margin is at least equal to a sum of an error in the A/D converter and a background noise level.

9. A rotating angle detecting apparatus comprising:
an angular resolver detecting a rotating angle and attached to a detected subject;
a direct-current offset voltage applying circuit applying a direct-current offset voltage to an output from the angular resolver;
an A/D converter A/D converting an output from the direct-current offset voltage applying circuit; and
a computing unit applying an exciting voltage to the angular resolver and detecting a rotating angle of the angular resolver on the basis of an output from the A/D converter,
wherein the direct-current offset voltage applying circuit comprises a differential amplifier, a first resistance connected between an inverting input of the differential amplifier and a reference potential, a second resistance for a negative feedback connected between an output and the inverting input of the differential amplifier, a third resistance connected in series between the angular resolver connected to the reference potential and a non-inverting input of the differential amplifier, and a fourth resistance connected between an offset potential and the non-inverting input,
wherein values of the first resistance, the second resistance, the third resistance and the fourth resistance are set such that an output of the differential amplifier becomes equal to or more than a predetermined margin for preventing an erroneous ground fault detection in the computing unit, in a difference between a minimum output potential at a time when the angular resolver is not in a ground fault generated by a variation of the values of the first resistance, the second resistance, the third resistance and the fourth resistance and the direct-current resistance component of the angular resolver output coil, and a maximum potential at a time when the angular resolver is in the ground fault, and
wherein a magnification of said third resistance with respect to a direct-current resistance component of said resolver output coil is determined not to exceed 4.

* * * * *